(12) United States Patent
Barniak, Jr.

(10) Patent No.: US 7,766,258 B2
(45) Date of Patent: Aug. 3, 2010

(54) HANDHELD WINDSHIELD CLEANING APPARATUS AND METHOD OF USING WHILE DRIVING

(76) Inventor: Thomas John Barniak, Jr., 6011 Lance Rd., Medina, OH (US) 44256

( * ) Notice: Subject to any disclaimer, the term of this patent is extended or adjusted under 35 U.S.C. 154(b) by 129 days.

(21) Appl. No.: 12/001,608

(22) Filed: Dec. 13, 2007

(65) Prior Publication Data
US 2008/0315013 A1 Dec. 25, 2008

Related U.S. Application Data

(60) Provisional application No. 60/936,314, filed on Jun. 21, 2007.

(51) Int. Cl.
*B60S 1/46* (2006.01)
(52) U.S. Cl. .................. 239/284.1; 239/302; 239/375; 239/526; 239/532
(58) Field of Classification Search .............. 222/79, 222/330; 239/284.1, 284.2, 302, 329–331, 239/375, 525, 526, 532, 550, 564; 401/137, 401/139, 188 R
See application file for complete search history.

(56) References Cited

U.S. PATENT DOCUMENTS 3,225,964 A * 12/1965 Rogstad ...................... 222/79
4,298,167 A * 11/1981 Stahl et al. .................. 239/129
4,778,301 A    10/1988 Sicotte
5,316,401 A *  5/1994 Sears ......................... 401/139
5,908,255 A    6/1999 Branch
5,987,685 A   11/1999 Lambert
6,065,890 A *  5/2000 Weitz ......................... 401/146
6,234,347 B1 * 5/2001 Amron ........................ 222/1
6,244,771 B1   6/2001 Bruggeman
6,283,656 B1   9/2001 Jiang
6,315,478 B1  11/2001 Atkins
6,523,213 B1   2/2003 Post
6,543,951 B1   4/2003 Bauman
6,675,812 B1 * 1/2004 Wiley ......................... 132/108
6,854,910 B2   2/2005 Leblanc
6,935,531 B1 * 8/2005 Clayton ....................... 222/79
7,490,783 B2 * 2/2009 Mueller et al. .............. 239/315

* cited by examiner

*Primary Examiner*—Len Tran
*Assistant Examiner*—Jason J Boeckmann

(57) ABSTRACT

An apparatus that is used by the driver or the passenger of a motor vehicle to clean the window of the motor vehicle, while the vehicle is in motion. The apparatus is used by either the driver or the passenger and is extend out of either side window to spray fluid on the windshield. The device is operated by a diaphragm pump that transports the fluid from a reservoir to the outlet nozzles. The fluid is sprayed in a jet-like fashion onto the windshield surface for the windshield wipers to use as a wetting agent for cleaning and clearing the windshield. The apparatus includes a sponge holder and a sponge that allows the operator to clean and clear the windshield even if the windshield wipers are not working properly.

2 Claims, 4 Drawing Sheets

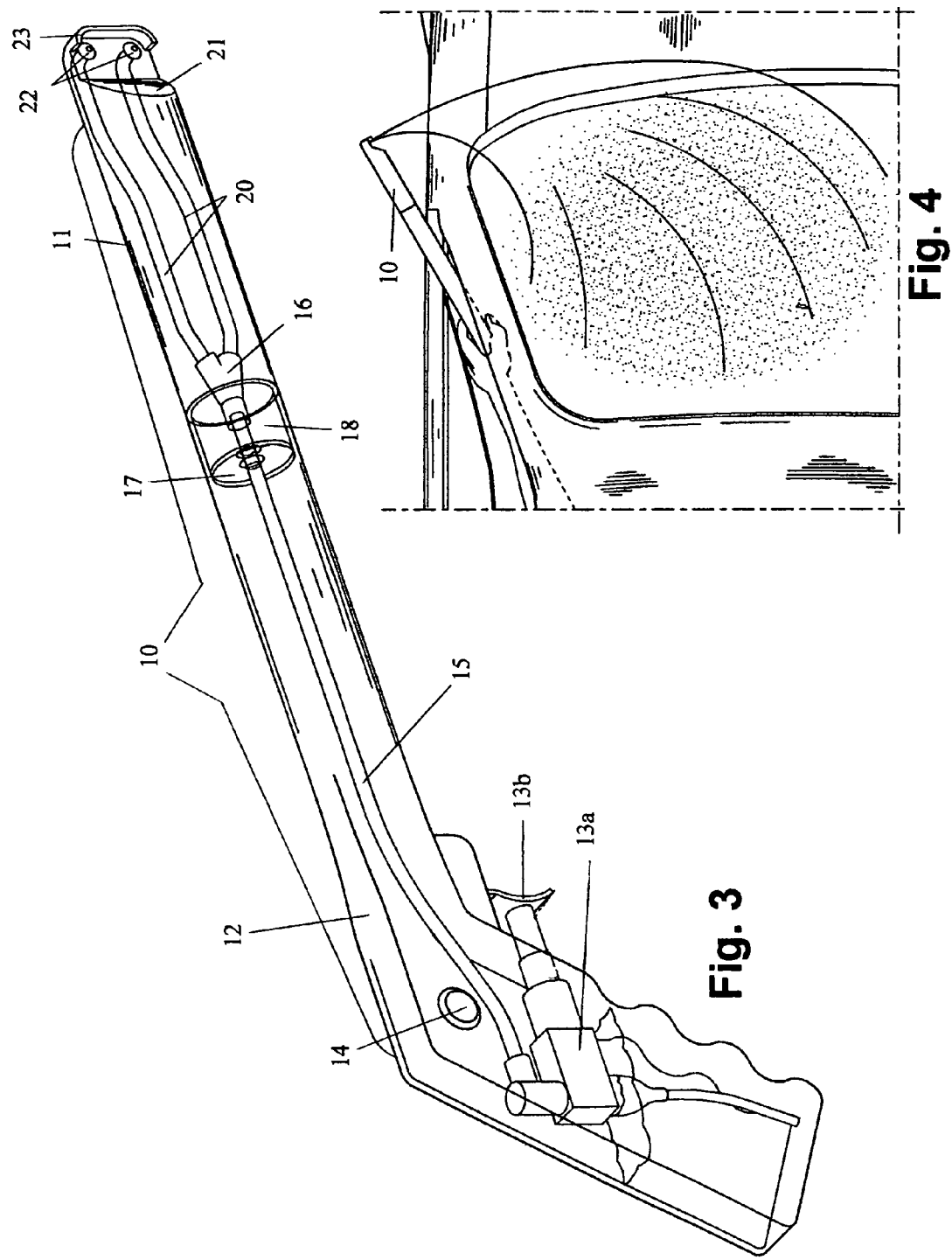

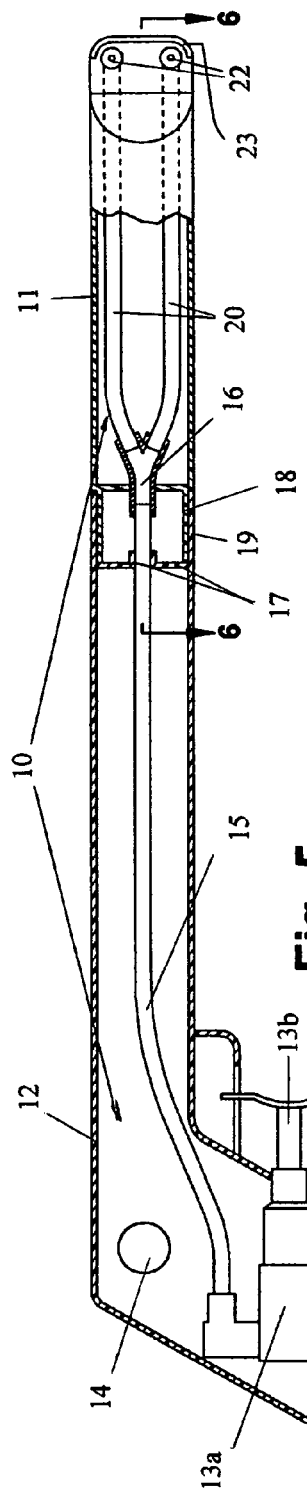
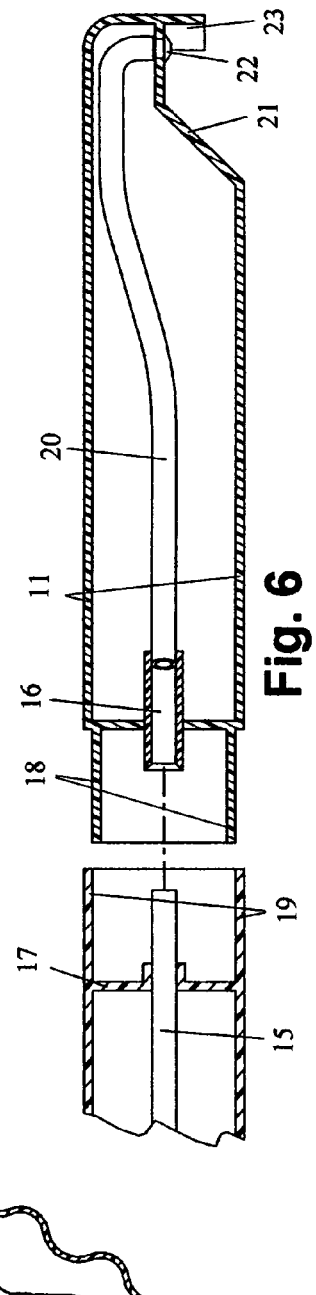
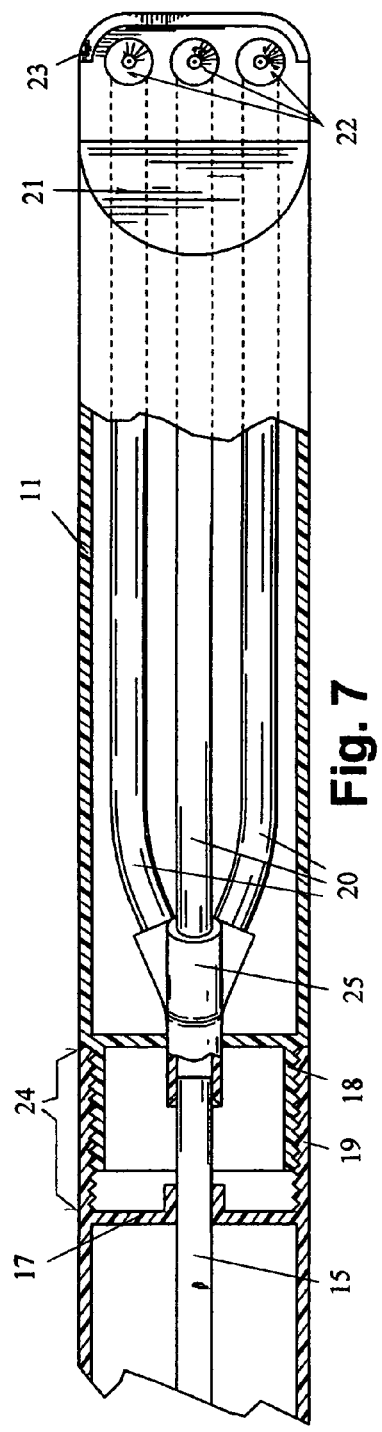

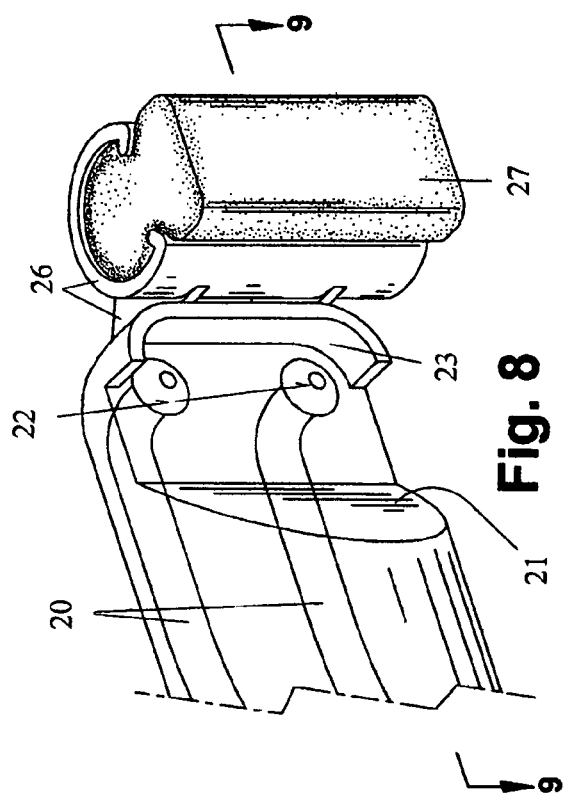
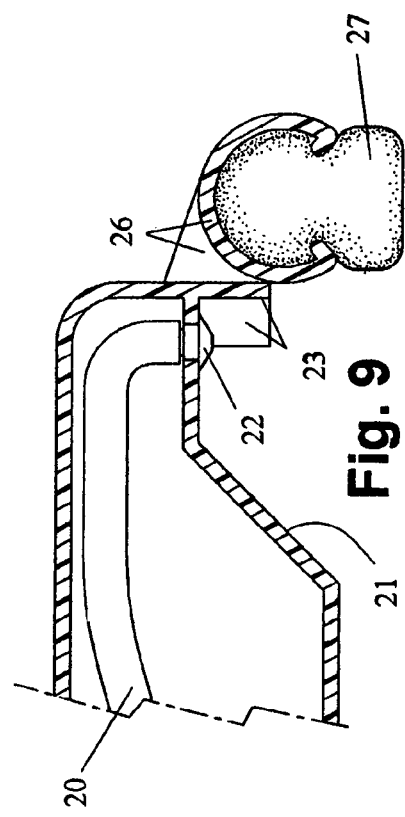

HANDHELD WINDSHIELD CLEANING APPARATUS AND METHOD OF USING WHILE DRIVING

CROSS-REFERENCE TO RELATED APPLICATIONS

This application claims the benefit of provisional patent application Ser. No. 60/936,314, filed 2007 Jun. 21 by the present inventor, which is incorporated herein.

BACKGROUND OF THE INVENTION

1. Field of the Invention

The present invention relates to handheld implements utilized for liquid dispersion to an objective surface for the purpose of cleaning or clearing that said surface and more precisely, to a tool held and activated by the human hand that is capable of dispersing a liquid in jet-like streams onto the surface of an automobile windshield by the driver of that automobile while the vehicle is moving and being driven in traffic for the purpose of maintaining a clear and clean field of visual sight through the windshield glass, which is essential when driving and steering an automobile.

2. Description of the Related Art

Automobile windshield water dispersing nozzles and their total encompassing system and components work well for the typical automobile in most circumstances. Water or a mixture of water and an anti-freeze cleaning agent is readily dispersed in streams onto the windshield glass surface by simply pressing or turning an electronic switch or lever located in the instrumentation on the driver's side of the vehicle. The windshield wipers therein distributes the liquid in an evenly fashion over the glass surface with the wiper blades eventually cleaning the dirt, dried salt spray, or whatever is obstructing the view through the glass for the driver of the automobile. However, since all windshield washer and washing systems in all automobiles are mechanical and electronic in their component composition, most are inherent to an eventual mechanical breakdown, especially as the vehicle ages and acquires a high degree of driving mileage. Also, in some instances, the driver simply forgets to keep or add liquid in the washing system's reservoir, usually located under the front hood at the engine compartment. The third dangerous driving scenario, and the most common one, is that as the windshield wiper resilient blades become aged and stiffen and if not replaced in a timely manner, it will take more liquid on the surface of the windshield glass to implement their cleaning and clearing ability as they reciprocate in their back-and-forth motion. It is possible to run all the water, ice-melt, or any liquid out of the system with frequent usage of the windshield washers in a winter driving condition with worn wiper blades whereas salt spray from other vehicles constantly obscures the windshield glass. Bad weather driving conditions, worn-out wiper blades and the unexpected depletion of all liquid in the windshield washing system can quickly turn into a dangerous and even deadly driving scenario on a highway if not addressed by the driver of that vehicle. Taking the vehicle off the roadway in an emergency situation, especially on an interstate highway, is not the desired option for any driver but is the only safe option in the aforementioned scenario—and it really isn't safe pulling off into the emergency right lane and stopping while everyone else is rolling by at 60-70 MPH either—just to clean the windshield by hand or to wait for an officer of the law for assistance.

There is no substitute for proactive inspection and maintenance of an automobile's windshield washing system, especially in a cold-weather state subject to extreme driving conditions just around that next mountain pass or that end of the state with the dreaded lake effect conditions. If any situation arises and for any reason, a driver is not able to keep the windshield glass in a reasonable state of transparentness because of a malfunctioning washing system or for lack of fluid, an interim implement would be sought and desired by that driver to accomplish the feat of applying that liquid fluid onto the windshield surface glass while that driver is still moving forward down the highway. After an exhaustive search of the marketplace, the present inventor has concurred that there is presently no tool or implement currently available that is capable of performing the interim function of dispersing multiple streams of liquid fluid onto a windshield surface in a safe manner while the vehicle is moving forward in traffic and thereby will make a straightforward disclosure of the present invention in its foremost embodiments.

SUMMARY OF THE INVENTION

The present invention can be described as being a handheld implement in a pistol-like configuration of body structure, since this shape has an existing history of being easily and comfortably held by the human hand. The structure is an exterior membrane formed as a repository for accepting and storing a fluid or liquid, that is, it is of a hollow nature much like a toy water pistol. It also contains a diaphragm type of pumping mechanism within its fluid repository interior space connected to a finger-actuated trigger mechanism located on the exterior of the structure body so as to be activated by a finger for pumping of the pressurized fluid to and into the barrel end of the structure through an interior fluid line exiting the outlet side of the interior diaphragm pump mechanism, also much alike the aforementioned water pistol. This is where the similarities with a typical water pistol terminate, however.

Once the pressurized fluid flows from the pump through its connected fluid line into the barrel section end of the structure body, the single fluid line is converted through an adaptation method into multiple fluid lines and those multiple fluid line's directional flow are also changed to a degree not less than 90 degrees perpendicular to the single fluid line connected and adapted from at the barrel end of the structure. It is now possible, if there is liquid in the structure sufficient to be drawn into the diaphragm pump, for an operator to pump fluid through the repository structure and that fluid will transmute into multiple ports of exits through spray nozzles that are at least 90 degrees perpendicular to the direction the repository structure's barrel end is directed or pointed towards. Exactly stating—a person in the driver or passenger front seat of a typical automobile can turn down the window just enough to extend the barrel end and adapter out of the front side of the window closest to the windshield, pull the trigger multiple times to activate the diaphragm pump pushing the stored liquid through the total apparatus and out the nozzle ports at least in a 90 degree perpendicular angle relative to the barrel and onto the windshield glass surface. As fast as the operator can pull the trigger, the fluid will spray in a jet-like manner much like the vehicles windshield washer nozzle ports. As the operator applies the liquid fluid, the vehicle's windshield wipers will distribute the fluid and then squeegee or blade the fluid off, thereby cleaning and clearing the windshield until the next time the apparatus is needed for a repeat performance. It should be notated that this operation is accomplished while the vehicle is moving forward and the operator's hand that is holding the present invention apparatus never has to extend beyond a planar midpoint line of the window glass contained in the door. Exactly stating—the operator's hand stays inside the vehicle, the barrel and adapter are outside the aforementioned planar line only—allowing for this function to be carried out in a very safe fashion.

The present invention total apparatus is designed to be carried or stored inside the automobile, either on the floor of the vehicle by a heater vent, if used for winter conditions—the heater vent can warm the fluid stored, if desired-or in a center consol or even in a glove compartment. One of the reasons that the present invention apparatus is designed as a two-piece embodiment for disclosure in best mode is for keeping its total length to a reasonable measurement for the purpose of easy storage and less chance of breakage as it is also designed to be 100 percent plastic or plastic composite. The practicality of the present invention in a one-piece embodiment is less than the preferred two-piece embodiment but the manufacturing simplicity factor of a one-piece embodiment is not unknown to the present inventor and therefore will be disclosed and acknowledged as a viable entity in and of itself.

The present invention's novel features along with the objectivity and advantages of utilizing them will be realized after a further analysis of the detailed drawings of best mode embodiments and the detailed description accompanying them.

DRAWINGS

FIG. 3 shows the total invention apparatus composed of a preferred transparent membrane composite illustrating its inner components.

FIG. 4 is a top plan view of the invention apparatus held by the operator's (driver's) left hand in a typical dispersion of fluid scenario onto the windshield at the driver's side.

FIG. 5 is a side view of the total invention apparatus in a transparent membrane composite outer body showing the handheld main structure body with a slidable adapter connected to it at the barrel end.

FIG. 6 is a top section view of the slidable invention adapter of FIG. 5 unconnected to the barrel and showing through the transparent membrane outer body the interior fluid lines of the adapter turning at a right angle at the nozzle termination tapered outlet end of the adapter.

FIG. 7 is a side view through the transparent membrane of an adapter threadably connected to the barrel end of the main structure body showing an adapter with a three-way configuration of multiple fluid lines in its interior and three-nozzle termination outlet at the tapered end of the adapter body.

FIG. 8 is a close-in isometric view of the tapered body at the nozzle termination end of an adapter showing the interior fluid line's right angle turn into the nozzles and a sponge holder integrated into the adapter end outer structure body and the item sponge inserted.

FIG. 9 is a top section view of the tapered adapter end of FIG. 8 showing the interior fluid lines in a right angle turn into the nozzle ends and showing good detail of the pocket that the nozzles are built into by the integration of the c-shaped body of the sponge holder with sponge inserted.

REFERENCE NUMERALS

| 10 | total apparatus body | 11 | front adapter part after barrel |
| 12 | reservoir body part | 13a | diaphragm pump |
| | | 13b | finger-activator |
| 14 | filler hole with plug in reservoir body | 15 | single fluid pressure line |
| 16 | Y-shaped adapter-fixed or slidable hub | 17 | membrane wall at barrel |
| 18 | adapter body support structure | 19 | barrel end-receiving |
| 20 | multiple fluid lines | 21 | tapered body-adapter front |
| 22 | spray nozzle terminations | 23 | windshield structure |
| 24 | adapter to reservoir threaded connection area | 25 | fluid line 3-way configuration adapter |
| 26 | integrated sponge holder | 27 | sponge composite-inserted |

DETAILED DESCRIPTION AND OPERATION OF DRAWING FIGURES

Figure 1:
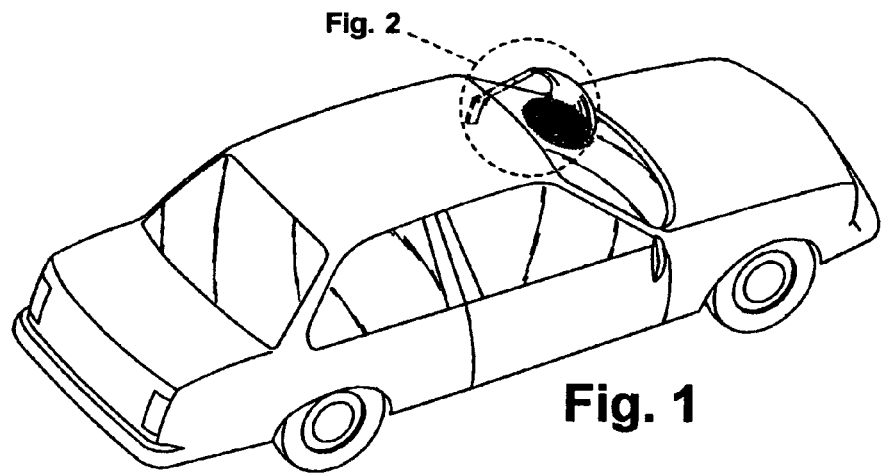
FIG. 1 is a broad overall view of an automobile exterior with a circled plan view of the present invention apparatus dispersing a liquid agent onto the windshield of the automobile at the driver's side.
Figure 2:
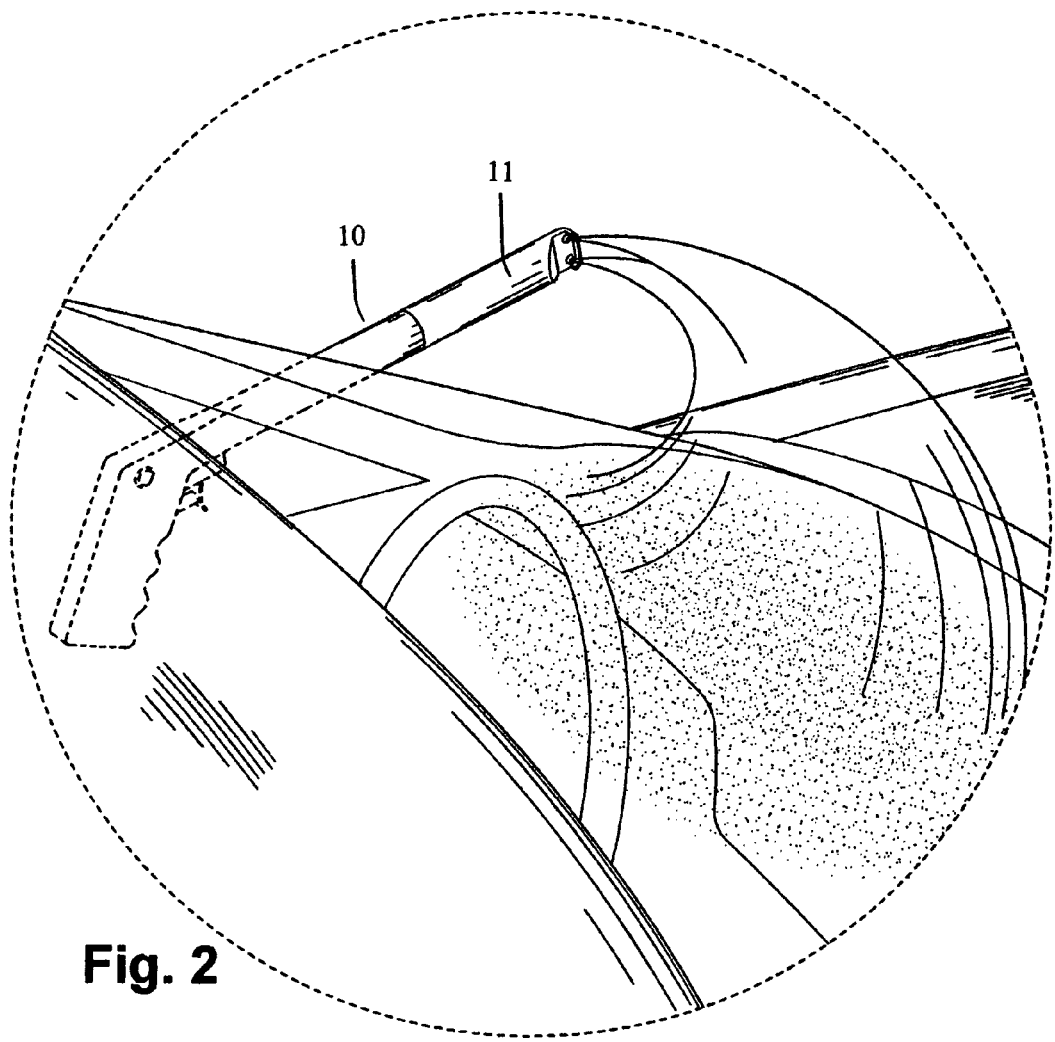
FIG. 2 is the close-in plan view of the circled area of FIG. 1 showing more detail of the liquid dispersion onto the windshield at the driver's side by the present invention apparatus.

FIG. 1 is a broad perspective top view of the invention apparatus spraying liquid fluid onto the driver's side of the windshield (circled area) of a typical automobile. The enlarged plan view of FIG. 1 (as FIG. 2) shows the total apparatus body 10 and front adapter part 11 in more detail as the front adapter 11 sprays the fluid at a 90 degree or perpendicular angle to the directional line that the total apparatus body 10 is pointed at or towards—the front of the vehicle.

FIG. 3 is a perspective view of the total apparatus body 10 in a one-piece embodiment showing the reservoir body 12 and the front adapter 11 which converts the single fluid pressure line 15 exiting the diaphragm pump 13a with trigger activator 13b into two fluid lines 20 after the single fluid line 15 enters the Y adapter 16. Observe and note how the operator's (driver's) hand stays inside the plane of the vehicle door and window as the operator puts a portion of the total apparatus body 10 out of the top of the open window of the door to disperse the fluid onto the windshield as shown in the perspective top view of FIG. 4. If the tapered body 21 located at the adapter front end, which also contains the spray nozzle terminations 22, is extended past a planar line of the vehicle's windshield at the corner of the door or body fuselage, that will be a sufficient point for the operator to pull the activator trigger 13b on the diaphragm pump 13a, expelling jets of the fluid that is stored in the reservoir body 12 onto the windshield where it can then be distributed and bladed off by the windshield wipers, thereby cleaning and clearing the windshield.

FIG. 5 is a side view of the total apparatus body 10 in its two-piece embodiment containing a reservoir body 12 and front adapter 11 slidably connected to each other at the section 6. The top section view of FIG. 6 shows in detail how the adapter body support structure 18 slides into the receiving barrel end 19 in conjunction with the single fluid line 15 slidably fitting into the y-shaped adapter 16—all in a friction fitting and form-fitting manner. Section view FIG. 6 also shows good detail of the multiple fluid lines 20 turning 90 degrees interiorly and terminating at the spray nozzles 22. The windshield structure 23 is an extension of the outer membrane composite of the front of the adapter body 11 and designed as a protective wall for the spray nozzles 22 from the oncoming headwinds expected to be encountered when using while the vehicle is moving. The windshield structure 23 will help to keep the dispersed fluid in a jet-like stream for length of distance before the physical transmutation into spray droplets and can be projected any measurement of extension for satisfactory utility.

The front adapter body 11 is shown as another type of connection method embodiment in FIG. 7 whereas the total apparatus body 10 contains a threaded connection area 24 instead of a slidable connection to and into the reservoir body 12. Exactly stating, the receiving barrel end 19 and the adapter body support structure 18 contain threads that interconnect to each other rather than the aforementioned slidable connection method of FIG. 6. Also, a 3-way configuration adapter 25 is shown as an alternative to a Y-adapter 16 for the purpose of moving more fluid through the front adapter 11 and dispersing it at three nozzle terminations 22. It should be stated that the single fluid line 15 is slidably connected to the 3-way adapter 25 therefore it reciprocally spins inside the connection hub of the 3-way adapter 25 as the front adapter body 11 is threadably connected to and into the reservoir body 12 at the threaded connection area 24. The threaded connection area 24 assures a watertight front adapter 11 to reservoir body 12 connection. The membrane wall at the barrel 17 shown in FIG. 5-7 defines the fluid repository capacity of the reservoir body 12. A final point should be stated that the slidable adapter body and the threaded adapter body are both capable in their ease of 360 degree turning while attached to their respective reservoir bodies by simply gripping the front adapter body 11 and turning the slidable or threaded connection fitting to the desired angle of direction. This feature will facilitate the usage of the total apparatus body 10 by a potential passenger on the opposite side of the front seating area to disperse fluid on that side of the front windshield since the front adapter body 11 would have to be turned 180 degrees or thereabouts for the proper direction of dispersal.

FIG. 8 shows a close-in perspective view of the extreme front end of an adapter body part 11 showing good detail of the aforementioned numbered components and also the important feature of a sponge holder 26 that will be integrated or cast into the exterior membrane at the extreme front of the adapter body 11. Not only does the sponge holder 26 with sponge 27 create more wind spoiler or shield for the initial dispersals of fluid, adding potential measurement to their distance of dispersal, the operator can apply the sponge and fluid in tandem to the surface of the windshield to clean a problem spot or area if particularly soiled or if a worn wiper does not work to clean properly. FIG. 9 is a detailed top section view of FIG. 8. The sponge 27 is of a resilient nature and intended to be inserted and replenished by hand after a used sponge is taken out of the holder 26 and disposed of in a reasonable manner. It is also possible to integrate a rubberized vinyl blade and/or squeegee holder (not shown) onto the immediate front facade of the front adapter 11 as a substitute for the sponge holder 26.

Although the preferred embodiments of the present invention have been disclosed and described in their component composition, operation and objects and advantages of usage, slight modifications for an attempt at a level of improvement to the present invention is always possible by the present inventor. Therefore, the disclosed embodiment structures should not be construed as limiting in any nature pertaining to the total scope of the present invention.

I claim:

1. A handheld fluid spraying apparatus for remotely cleaning a windshield of a motor vehicle while the motor vehicle is driven in a forward direction, the apparatus comprising;
    a liquid reservoir storage body having a longitudinal axis, the liquid reservoir storage body including: a liquid reservoir; a diaphragm pump; an exteriorly accessible, finger activated, trigger, the trigger being connected to said diaphragm pump; and a singular fluid flow line in fluid connection with said pump;
    a front structure body having a longitudinal axis, the front structure body including: a means for splitting said singular fluid flow line into multiple fluid flow lines, within an interior of said front structure body; each fluid flow line including an outlet nozzle; said multiple fluid flow lines turning a minimum of 90 degrees, in the same direction, at said outlet nozzles, with respect to said longitudinal axis of said front structure body; the outlet nozzles being located on a tapered front portion of said front structure body; said tapered front portion including an exterior wind shield structure sufficient in size to divert wind forces from the outlet nozzles; and a sponge holder including a sponge attached to the front of said wind shield structure, and;
    a connection means for connecting said liquid reservoir storage body to said front structure body, said connection means connecting said liquid reservoir storage body and said front structure body such that said longitudinal axis of the front structure body is aligned with the longitudinal axis of the liquid reservoir body and said front structure body is rotatable about its longitudinal axis with respect to the longitudinal axis of the liquid reservoir storage body; the singular fluid flow line of the liquid reservoir body being inserted into the means for splitting, of the front structure body;
    wherein the spraying apparatus is to clean said windshield, by an occupant sitting in a front seat of the said motor vehicle.

2. A method of cleaning a windshield of a motor vehicle by an occupant sitting in a front seat of said motor vehicle when the said motor vehicle is driven forward, the method comprising:
    providing a handheld fluid spraying apparatus, the spray apparatus including:
    a liquid reservoir storage body having a longitudinal axis, the liquid reservoir storage body including: a liquid reservoir; a diaphragm pump; an exteriorly accessible, finger activated, trigger, the trigger being connected to said diaphragm pump; and a singular fluid flow line in fluid connection with said pump;
    a front structure body having a longitudinal axis, the front structure body including: a means for splitting said singular fluid flow line into multiple fluid flow lines, within an interior of said front structure body; each fluid flow line including an outlet nozzle; said multiple fluid flow lines turning a minimum of 90 degrees, in the same direction, at said outlet nozzles, with respect to said longitudinal axis of said front structure body; the outlet nozzles being located on a tapered front portion of said front structure body; said tapered front portion including an exterior wind shield structure sufficient in size to divert wind forces from the outlet nozzles; and a sponge holder including a sponge attached to the front of said wind shield structure, and;
    a connection means for connecting said liquid reservoir storage body to said front structure body, said connection means connecting said liquid reservoir storage body and said front structure body such that said longitudinal axis of the front structure body is aligned with the longitudinal axis of the liquid reservoir body and said front structure body is rotatable about its longitudinal axis with respect to the longitudinal axis of the liquid reservoir storage body; the singular fluid flow line of the liquid reservoir body being inserted into the means for splitting, of the front structure body;

rotating said front structure body about its longitudinal axis, with respect to the longitudinal axis of the liquid reservoir body, such that the outlet nozzles face in the direction of said vehicle windshield; and extending said tapered front portion of said spraying apparatus in front of said vehicle windshield and activating said diaphragm pump via the trigger, thereby spraying liquid stored in said liquid reservoir from said outlet nozzles onto said vehicle windshield.

* * * * *